Patented June 8, 1943

2,321,440

UNITED STATES PATENT OFFICE 2,321,440

COMPOSITION OF MATTER AND PROCESS FOR MAKING THE SAME

Alger L. Ward, Drexel Hill, Pa., assignor to The United Gas Improvement Company, a corporation of Pennsylvania No Drawing. Application March 28, 1939, Serial No. 264,591

7 Claims. (Cl. 260—619)

The present invention relates to the production of aryl substituted phenols. More particularly, it relates to the production of aryl substituted phenols by reacting phenols with unsaturated aromatic hydrocarbons including styrene obtained from light oil from the pyrolysis of petroleum oil.

The lower boiling condensate and the distillate from the tar produced in the manufacture of carburetted water gas, oil gas, and the like, which involve the pyrolysis of petroleum, is termed light oil. The higher boiling portion of the light oil contains a variety of unsaturated aromatic hydrocarbons mixed with saturated aromatic hydrocarbons of neighboring boiling points.

For instance, the higher boiling portion of a light oil produced in the manufacture of oil gas may contain styrene, ortho, para, and meta methyl styrene, indene, and other unsaturated aromatic hydrocarbons in admixture with the xylenes, cumene, pseudo-cumene, durene, and possibly other saturated aromatic hydrocarbons. These unsaturated hydrocarbons may be concentrated by further fractionation of the higher boiling portion of the light oil. For instance, a light oil produced in the manufacture of oil gas has been fractionated as follows to concentrate the following unsaturated aromatic hydrocarbons:

Cut points
135° to 140° C_____Styrene forerunnings
140° to 150° C_____Styrene
150° to 160° C_____Unsaturates $A_1$
160° to 167° C_____Unsaturates $A_2$
167° to 172° C_____Para-methyl styrene group
172° to 175° C_____Meta-methyl styrene group
175° to 182° C_____Indene group
182° to 190° C_____Unsaturates $B_1$
190° to 200° C_____Unsaturates $B_2$ The letters $A_1$, $A_2$, $B_1$, and $B_2$, refer to unsaturated aromatic hydrocarbons or mixtures of such unsaturates, not definitely identified.

According to the present invention, unsaturated aromatic hydrocarbons including styrene obtained from light oil from the pyrolysis of petroleum oil, are reacted with phenols in the presence of a mineral acid catalyst, under controlled temperature conditions to produce aryl substituted phenols.

The entire portion of the light oil containing aromatic unsaturated hydrocarbons and including styrene, may be reacted with phenols to give mixed aryl substituted phenols corresponding to the various aromatic unsaturates contained therein, or preferably the light oil may be fractionated to concentrate styrene and phenols reacted with the unsaturated aromatics in such fractions to give substituted phenols of greater or lesser purity.

It may be desirable in the case of highly concentrated individual unsaturates or groups, to add an inert solvent such as a saturated hydrocarbon prior to reaction with the phenol.

By phenols, I intend to mean the mono and polyhydroxy derivatives of benzene and its homologues, such as for instance, phenol, cresol, resorcinol, pyrogallol, hydroquinone, pyrocatechol, naphthols, and the like, and substitution products of such compounds. As examples of acids suitable as catalysts for the reaction, sulphuric acid and phosphoric acid may be mentioned.

I have found that the aryl substituted phenols produced in the performance of my invention may be reacted with aldehydes to form resins which are soluble in drying oils, such as linseed oil and tung oil. This characteristic gives them great value for use in varnishes and lacquers in which the usual phenol aldehyde condensation products cannot be used due to their incompatibility with linseed oil and tung oil.

By aldehydes, it is intended to means the aldehydes customarily employed in the production of phenol aldehyde condensation products of which, for example, formaldehyde and furfural may be preferred because of their relative cheapness.

I have found that in the performance of my invention, in addition to producing valuable aryl substituted phenols, the saturated aromatic hydrocarbons contained in such light oil fractions from the pyrolysis of petroleum may be recovered in a state of purity which requires little or no washing and, therefore, obviates the large wash losses which arise in the washing of these saturated aromatic hydrocarbons in the presence of the unsaturates.

I have further found that by controlling the concentration of the phenol with respect to the unsaturated aromatic hydrocarbons contained in such light oil fractions, the proportion of the mono substituted aryl phenols with respect to di- and tri-substituted phenols may be controlled, increasing excesses of phenol giving higher proportions of mono substituted products.

The invention will be further understood by reference to the following illustrative examples:

EXAMPLE 1

4½ mols of phenol were weighed into a 3 necked flask equipped with a stirring device, a dropping funnel and a thermometer. To this was added 0.5 cc. of 96% $H_2SO_4$. To this was added 1500 grams of a light oil hydrocarbon fraction obtained in the manufacture of oil gas, which contained 10.4% styrene as determined by bromine titration. (1½ mols styrene). Very little heat of reaction resulted, but the addition of the hydrocarbon was continued at a slow rate over a period of 2 hours. To facilitate agitation at the start of the reaction, the phenol was melted by heating it on a water bath to about 42° C.

When addition of the hydrocarbon fraction had been completed, heat was applied and the material was kept at a temperature of 130–160° C. for 2 hours. After cooling to 100° C., the sulfuric acid in the mixture was neutralized by adding the calculated quantity of $Na_2CO_3$ dissolved in a few cc. of water. Two such runs were made and united before working up to obtain the desired products.

The purification of the desired condensation product and the recovery of the excess phenol and saturated hydrocarbon was accomplished as follows:

Without further washing or other treatment the reaction mixture was distilled. Some phenol contained in the hydrocarbon cut was washed out for recovery. A light yellow fraction distilling at 140–195° C. at 2–6 mm. absolute pressure, was obtained which was substantially pure styryl phenol. The following table summarizes the data obtained:

*Table 1*

|  | Theoretical yield | Actual yield | Percent of theory |
|---|---|---|---|
|  | Grams | Grams |  |
| Unreacted hydrocarbon | 2,688 | 2,647 | 98.2 |
| Unreacted phenol | 658 | 662 | 100.3 |
| Styryl phenol |  | 398 | 67.2 |
| Residue |  | 130 |  |
| Loss (unaccounted for) |  | 9 |  |

Tests showed the material distilling at 140–195° C. at 2–6 mm. absolute pressure, to be substantially monostyryl phenol, while the residue contained higher substitution products.

As before stated, the proportion of mono substituted phenols to di-substituted and tri-substituted phenols produced in the reaction may be controlled by controlling the proportion of phenol to the unsaturated aromatic hydrocarbons, a molar excess of phenol having been found desirable when the desired products are mono substituted phenols. However, the excess of phenol may be limited by practical considerations and it may be desirable to employ proportions resulting in the production of considerable proportions of both mono and di-substituted products.

For instance, when a styrene-containing light oil fraction and phenol are reacted with phenol in mol ratios of phenol to styrene of 5 or under, the distillation in vacuo of the resulting condensation products will show the presence of at least two constituents. The first of these distills mainly in the range of 145 to 175° C. at 2 to 6 mm. pressure, while the higher boiling constituent distills in the range of 215 to 230° C. at the same pressure. Both of these materials are phenolic in nature as shown by the fact that Zerewitinoff determinations have shown the lower boiling cut to be about 99% phenolic in nature and the higher boiling cut about 93% phenolic. These and other tests have determined the lower boiling cut to be mono-styryl phenol, and the higher boiling cut, a very viscous amber liquid, to be substantially distyryl phenol.

Varying proportions of mono and di-substituted phenols may be secured by varying the ratio of the reactants as illustrated in the following table, giving yields from batches of the same size.

*Table 2*

| Molar ratio phenol/styrene | Yield-grams mono-styryl phenol | Yield-grams di-styryl phenol |
|---|---|---|
| 5 | 184.8 | 16.2 |
| 3 | 167.4 | 29.4 |
| 2 | 140.2 | 55.5 |
| 1 | 90.0 | 70.0 |

Thus a typical preparation of distyryl phenol may be as follows:

EXAMPLE 2

To two mols of phenol containing 0.2% by weight of $H_2SO_4$ is added slowly 1 mol of styrene dissolved in from ½ to 10 parts of other constituents of a light oil fraction obtained in manufacture of oil gas. The temperature is kept below 50° C. by regulation of the rate of addition. When the styrene solution is all added the mass is heated to 120–150° C. for 2 hours with agitation. After neutralization of the $H_2SO_4$ with the calculated amount of $Na_2CO_3$ solution, the product is fractionally distilled. The fraction distilling at 215–250° C. at 2–5 mm. absolute pressure, will be found to be principally distyryl phenol.

It will be seen from the examples given above, that the process of the invention provides a simple and inexpensive separation of the products of the reaction.

After neutralization of the small quantity of acid, it is only necessary to distill the products to recover separately the unreacted hydrocarbons and water, the unreacted phenol, and to separate the mono aryl phenol from di-aryl phenols and any higher substitution products, which are less valuable products. It is not necessary to wash out the acid catalyst prior to distillation because of the small quantity employed.

The procedure permits the recovery of the saturated aromatic hydrocarbons of the light oil styrene fractions obtained in the pyrolysis of petroleum, which contain considerable concentrations of aromatic unsaturates without the large wash losses incident to washing out the aromatic unsaturates and further provides for recovering the aromatic unsaturates as valuable aryl phenols.

For instance, in the production of styryl phenols from light oil fractions containing styrene, obtained in the manufacture of oil gas, examination of the xylene separated from the products as unreacted hydrocarbon showed less than 5% unreacted styrene, which is usually the only appreciable unsaturation in close styrene cuts.

As stated before, the aryl phenols produced in accordance with the present invention may be reacted with aldehydes to produce substituted phenol-aldehyde resins which are compatible with drying oils, such as linseed oil and tung oil.

The following are illustrative examples of such aldehyde condensations.

EXAMPLE 3

½ mole of styryl phenol based upon the theoretical formula was weighed out and to it added 1% by weight of oxalic acid. ½ mole of formaldehyde was then added and the mixture agitated and refluxed for three hours. Since there was not much evidence of reaction, an excess of the phenol was added. The mixture was then refluxed for an additional 19 hours. The products were then cooled and subsequently steam distilled for over 2 hours with pot and steam temperatures higher than 200° C., obtaining low melting point resins. The following table shows the data obtained.

Table 3

|  | Boiling range of substance at 3 mm. pressure | | |
| --- | --- | --- | --- |
|  | 145° C. to 150° C. | 220° C. to 250° C. | 150° C. to 250° C. |
| Grams oxalic acid | 1 | 1.5 | 1.2 |
| Grams formaldehyde at beginning | 40 | 40 | 40 |
| Grams formaldehyde after 3 hours | 23 | 23 | 23 |
| Grams yield of resins | 71 | 92 | 69 |
| Melting pt. of resin °C | 83.5 | 56.0 | 67.8 |
| Color of resin (Gardner Holt) | 8 | 11 | 5 |
| Compatible with linseed oil | Yes | Yes | Yes |
| Compatible with tung oil | Yes | Yes | Yes |

The compatibility of these resins with the usually employed drying oils, linseed oil and tung oil, is an extremely valuable characteristic. It opens the door to the employment of phenol aldehyde condensation products in coating compositions, such as drying oil varnishes, and affords a new utilization for the unsaturated aromatic hydrocarbons contained in light oil from petroleum pyrolysis, of which there is an extremely large potential supply.

The process herein described also affords a more economical method of recovering the saturated aromatic hydrocarbons accompanying the unsaturated aromatic hydrocarbons in such light oil.

It is to be understood that the above particular description is by way of illustration and that changes, omissions, additions, substitutions, and/or modifications may be made within the scope of the claims without departing from the spirit of the invention which is intended to be limited only as required by the prior art.

I claim:

1. A process which comprises reacting a phenol with a light oil styrene fraction in the presence of a condensation catalyst, said fraction containing a plurality of unsaturated hydrocarbons and including styrene in an amount less than two thirds of said fraction, said light oil having been obtained by the pyrolysis of petroleum oil.

2. A process which comprises reacting a phenol with a light oil styrene fraction in the presence of a mineral acid catalyst, said fraction containing a plurality of unsaturated hydrocarbons and including styrene in an amount less than two thirds of said fraction, said light oil having been obtained by the pyrolysis of petroleum oil.

3. A process which comprises reacting a phenol with a light oil styrene fraction in the presence of a condensation catalyst and at a temperature of approximately 120° to 160° C., said fraction containing a plurality of unsaturated hydrocarbons and including styrene in an amount less than two thirds of said fraction, said light oil having been obtained by the pyrolysis of petroleum oil.

4. A process for obtaining a saturated aromatic hydrocarbon material from a light oil styrene fraction containing an addition to saturated hydrocarbon material a plurality of unsaturated hydrocarbons and including styrene in an amount less than two thirds of said fraction, said light oil having been obtained by the pyrolysis of petroleum oil, comprising reacting a phenol with said fraction in the presence of a condensation catalyst, and separately recovering from the resulting reaction mixture unreacted saturated aromatic hydrocarbon material and aralkyl phenolic reaction product.

5. A condensation product of a phenol with a light oil styrene fraction containing a plurality of unsaturated hydrocarbons and including styrene in an amount less than two thirds of said fraction, said light oil having been obtained by the pyrolysis of petroleum oil.

6. A condensation product of a phenol with a light oil styrene fraction containing a plurality of unsaturated hydrocarbons and including styrene in an amount less than two thirds of said fraction, said light oil having been obtained by the pyrolysis of petroleum oil, said condensation product distilling between 140°–195° C. at a pressure of 2–6 mm. Hg. absolute.

7. A condensation product of a phenol with a light oil styrene fraction containing a plurality of unsaturated hydrocarbons and including styrene in an amount less than two thirds of said fraction, said light oil having been obtained by the pyrolysis of petroleum oil, said condensation product distilling between 215°–250° C. at a pressure of 2–5 mm. Hg. absolute.

ALGER L. WARD.